United States Patent
Bui

(10) Patent No.: US 11,059,265 B2
(45) Date of Patent: Jul. 13, 2021

(54) GLUED ARRANGEMENT

(71) Applicant: Bayerische Motoren Werke Aktiengesellschaft, Munich (DE)

(72) Inventor: Hoang Viet Bui, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 150 days.

(21) Appl. No.: 15/900,431

(22) Filed: Feb. 20, 2018

(65) Prior Publication Data

US 2018/0169999 A1   Jun. 21, 2018

Related U.S. Application Data

(63) Continuation of application No. PCT/EP2016/066878, filed on Jul. 15, 2016.

(30) Foreign Application Priority Data

Aug. 21, 2015   (DE) .................... 10 2015 215 978.7

(51) Int. Cl.
*B32B 7/05* (2019.01)
*B62D 27/02* (2006.01)
(Continued)

(52) U.S. Cl.
CPC .................. *B32B 7/05* (2019.01); *B32B 5/18* (2013.01); *B32B 7/12* (2013.01); *B32B 37/12* (2013.01);
(Continued)

(58) Field of Classification Search
CPC ......... B32B 7/12; B32B 7/14; B32B 37/1292; B32B 2037/1269; B32B 3/02; B32B 3/04; B32B 7/05; B32B 5/18; B32B 37/12; B32B 38/0008; B32B 2307/54; B32B 2307/542; B32B 2375/00; B32B 2605/00;
(Continued)

(56) References Cited

U.S. PATENT DOCUMENTS 3,107,195 A * 10/1963 Stegler .................. E04B 1/6104
428/57
2003/0113724 A1   6/2003 Schembri et al.
(Continued)

FOREIGN PATENT DOCUMENTS

DE          103 47 652 A1   5/2005
DE   10 2004 009 880 A1    9/2005
(Continued)

OTHER PUBLICATIONS

Chinese Office Action issued in Chinese counterpart application No. 201680024671.9 dated Dec. 20, 2018 (Eight (8) pages).
(Continued)

*Primary Examiner* — Catherine A. Simone
(74) *Attorney, Agent, or Firm* — Crowell & Moring LLP

(57) ABSTRACT

A glued arrangement, preferably for a motor vehicle, is disclosed. The glued arrangement includes a first component, a second component, and at least one adhesive layer for connecting the two components. The adhesive layer includes a central zone and an edge zone that surrounds the central zone where, in the hardened state, the adhesive in the edge zone has a higher elasticity than the adhesive in the central zone.

15 Claims, 2 Drawing Sheets

(51) Int. Cl.
  *B32B 7/12* (2006.01)
  *B32B 37/12* (2006.01)
  *B32B 38/00* (2006.01)
  *B29C 65/00* (2006.01)
  *B29C 65/48* (2006.01)
  *B32B 5/18* (2006.01)
  *C09J 5/00* (2006.01)
  *B29C 65/14* (2006.01)
  *B29L 31/30* (2006.01)
  *B29C 65/82* (2006.01)
  *F16B 11/00* (2006.01)
  *B62D 29/04* (2006.01)

(52) U.S. Cl.
  CPC ........ *B32B 38/0008* (2013.01); *B62D 27/026* (2013.01); *C09J 5/00* (2013.01); *B29C 65/1406* (2013.01); *B29C 65/483* (2013.01); *B29C 65/485* (2013.01); *B29C 65/4835* (2013.01); *B29C 65/4845* (2013.01); *B29C 65/8215* (2013.01); *B29C 66/1122* (2013.01); *B29C 66/3452* (2013.01); *B29C 66/43* (2013.01); *B29C 66/721* (2013.01); *B29L 2031/30* (2013.01); *B32B 2037/1269* (2013.01); *B32B 2307/54* (2013.01); *B32B 2307/542* (2013.01); *B32B 2375/00* (2013.01); *B32B 2605/00* (2013.01); *B62D 29/048* (2013.01); *C09J 2301/416* (2020.08); *F16B 11/006* (2013.01)

(58) Field of Classification Search
  CPC ........ F16B 11/006; F16B 5/00; F16B 5/0004; C09J 5/04; C09J 5/06; C09J 5/10; C09J 5/00; C09J 2301/416; B62D 27/026; B62D 29/005; B62D 29/048; B62D 27/023; E04B 1/6104; B29C 65/48; B29C 65/4805; B29C 65/483; B29C 65/4835; B29C 65/484; B29C 65/485; B29C 65/4845; B29C 65/8215; B29C 66/1122; B29C 66/3452; B29C 66/43; B29C 66/721; B29L 2031/30
  See application file for complete search history.

(56) References Cited

U.S. PATENT DOCUMENTS

2015/0004345 A1* 1/2015 Chaung .................... B32B 7/14
                                                       428/41.7
2016/0243791 A1* 8/2016 Court .................... B32B 37/144

FOREIGN PATENT DOCUMENTS

DE    10 2013 107 849 A1    1/2015
EP         1 403 108 A1     1/2015
WO    WO-2015059394 A2 *    4/2015    ............. B32B 5/142

OTHER PUBLICATIONS

PCT/EP2016/066878, International Search Report dated Sep. 15, 2016 (Two (2) pages).
German Search Report issued in German counterpart application No. 10 2015 215 978.7 dated Apr. 28, 2016, with Statement of Relevancy (Eight (8) pages).

* cited by examiner

GLUED ARRANGEMENT

CROSS REFERENCE TO RELATED APPLICATIONS

This application is a continuation of PCT International Application No. PCT/EP2016/066878, filed Jul. 15, 2016, which claims priority under 35 U.S.C. § 119 from German Patent Application No. 10 2015 215 978.7, filed Aug. 21, 2015, the entire disclosures of which are herein expressly incorporated by reference.

BACKGROUND AND SUMMARY OF THE INVENTION

The present invention relates to a glued arrangement, preferably for a motor vehicle. Specifically, the adhesive layer between two components is described.

FIG. 3 shows in purely schematic representation a previously known glued arrangement 100 with two components 3, 4 and an adhesive layer 2 for the connecting of the two components 3, 4. The arrangement 100 is loaded with a force 7 to test the tensile shear strength. In order to discuss the problems which occur, the components 3, 4 and the adhesive layer 2 have been divided into individual finite elements.

Especially under tensile and compressive stresses, high peak values occur at the edge of the adhesive layer 2, which may result in a failure. Due to the use of structural adhesives with high E modulus in connection with high peak stresses, the corresponding adhesive layers have a critical place at the edge of the bonding. Since this represents a limiting factor, the glue connection cannot be scaled at will and its load-bearing capacity increases less than proportionately to the overlapping length. By increasing the overlapping length and consequently also the quantity of adhesive, therefore only a slightly larger load-bearing capacity is achieved. The result is contradictory demands on the glue connection, which are compensated by additional mechanical force closure connections. Consequently, material and installation expense and the associated costs are relatively high. Moreover, the failure of the glue connection may lead to safety-critical problems of the overall structure.

One problem which the present invention solves is to indicate a glued arrangement, preferably for a motor vehicle, which enables a durable connection with easy production and efficient use of the adhesive quantity.

Thus, the problem is solved by a glued arrangement. The glued arrangement is advantageously used in a motor vehicle. This may involve, for example, glued components of the body or the chassis. The arrangement according to the invention includes a first component and a second component, as well as at least one adhesive layer for connecting the two components. The two components are advantageously made of fiber-reinforced plastic. Alternatively, the components may also be made from simple plastic or metal. It is also provided that the two components are made of different materials. The two components are joined together directly with the adhesive layer, so that both components touch the adhesive layer.

According to the invention, it is provided that the adhesive layer includes a central zone and an edge zone enclosing the central zone. Both components are in contact with both the edge zone and the central zone. In the hardened state of the adhesive, the edge zone has a greater elasticity than the central zone. Thus, the E modulus in the edge zone is less than the E modulus in the central zone.

Due to the different elasticities in the edge zone and in the central zone, the peak stresses are reduced at the edge of the adhesive layer on account of the uniform distribution of the stress over the glue surface. Moreover, its load bearing ability is improved, which has a positive effect on the operating strength and the usage level of the material consumption. Therefore, depending on the application, the use of additional force-locking connectors may be unnecessary. The result is less weight for the arrangement, a reduced material and assembly expense and the associated costs are lower. Furthermore, almost any desired scaling of the glue connection is possible through the overlapping length. Because of better adhesion, there is greater security against failure under peak stresses. Consequently, the likelihood of a failure of the overall structure is also reduced and the safety of the persons involved is increased.

Basically, any desired adhesives may be used for the adhesive layer, both in the central zone and in the edge zone. For example, binary adhesives (with binder and hardener), thermal hardening adhesives, or UV-hardening adhesives can be used in this case.

According to a preferred embodiment, it is provided that the central zone and the edge zone consist of two different adhesives. In this case, the proper adhesives can be chosen for the particular application, so that in the hardened state the elasticity in the edge zone is greater than in the central zone. For example, a binary adhesive based on polyurethane is used for the central zone. The adhesives for the edge zone are elastic adhesives (low rigidities of 2 to 50 MPa or medium rigidities of 50 to 200 MPa) with large breaking elongation or deformation, in order to reduce possibly high peak stress or high strain in the edge zone. For example, disk adhesives may be used here.

Alternatively to the use of two different adhesives for the central zone and the edge zone, the same adhesive may also be used, with the central zone and the edge zone having different degrees of hardening.

The method of different hardening in the edge zone and in the central zone can also be used when two different adhesives are used in the zones.

Preferably, less hardener and/or a different hardener is used for the edge zone. In addition or alternatively, it is possible to heat the central zone more intensively and/or irradiate it more intensively with UV light, so that a stronger hardening occurs here. It is also provided, for example, to insert thermal conduction elements or light guides in the adhesive layer in order to influence the hardening in a local manner.

Depending on the loading which occurs for the arrangement, the edge zone is formed fully around the central zone or only at certain sites. It is preferably provided that the edge zone is arranged at least 30%, preferably at least 50%, especially preferably at least 70% around the periphery of the central zone. An especially preferred embodiment calls for a full arrangement (100%) of the edge zone.

Preferably, it is provided that the edge zone be directly adjacent to the central zone. Thus, there is no gap between the edge zone and the central zone.

The edge zone should be sufficiently large to enable an elastic glue connection in the edge region. However, a sufficient area should also be available for the central zone and thus for the relatively hard region of the adhesive layer. A quotient Q (Q=F/G) is defined, with the area F of the edge zone and the total area G of the adhesive layer (edge zone+central zone). Advantageously, the lower limit of the quotient is at least 0.01, preferably at least 0.05. The upper limit of the quotient Q is advantageously at most 0.8, preferably at most 0.4, especially preferably at most 0.3.

The E modulus of the central zone is advantageously at least 120%, preferably at least 150%, especially preferably at least 200% of the E modulus of the edge zone.

The two glued components are advantageously sheetlike components which are glued together in an overlap region. Thus, a relevant loading of the adhesive layer is a shear loading. The tensile shear strength of the central zone is advantageously at least 120%, preferably at least 150%, especially preferably at least 200% of the tensile shear strength of the edge zone. In particular, the tensile shear strength here is determined according to DIN EN 1465: 2009-07.

The invention furthermore comprises a method for making the just described arrangement. The method comprises the following steps:

(i) application of the adhesive layer with the central zone and the edge zone surrounding the central zone. In particular, the adhesives for both zones are applied before the components are placed one on top of the other. The edge zone is thus advantageously not injected subsequently between the two components.

(ii) Use of different adhesives for the central zone and the edge zone and/or different hardening of the adhesive in the central zone and the edge zone so that the edge zone has a greater elasticity than the central zone.

For the different hardening in the edge zone and in the central zone, a different quantity of hardener and/or a different hardener is advantageously used. In addition or alternatively, the edge zone and the central zone may be heated differently. In addition or alternatively, it is provided that the edge zone and the central zone are treated differently with UV light, in order to achieve different hardening in this way.

The invention furthermore comprises a motor vehicle having at least one of the specified glued arrangements. The two components in this case are in particular fiber-reinforced plastics which are used in the body or the chassis.

Other objects, advantages and novel features of the present invention will become apparent from the following detailed description of one or more preferred embodiments when considered in conjunction with the accompanying drawings.

Further details, features and benefits of the invention will emerge from the following specification and the drawings.

DETAILED DESCRIPTION OF THE DRAWINGS

Figure 1:
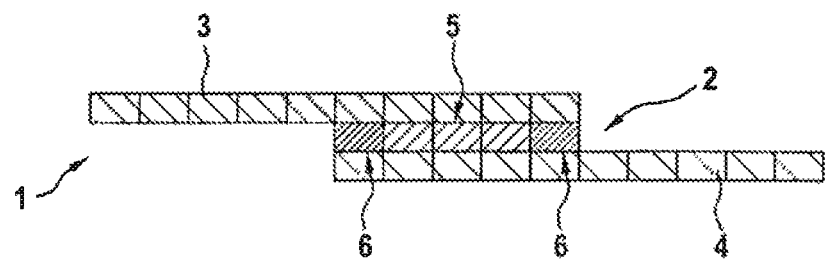
FIG. 1 is a schematic cross section view of a glued arrangement of the invention according to an exemplary embodiment.
Figure 2:
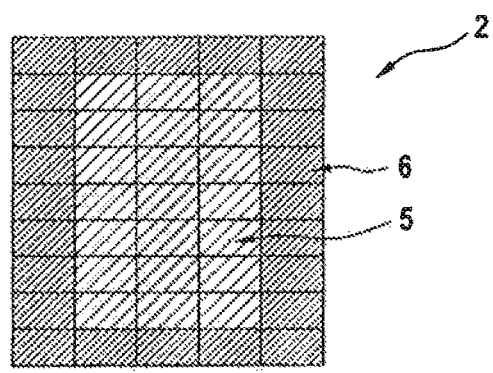
FIG. 2 is a schematic top view of the adhesive layer of the glued arrangement of the invention according to the exemplary embodiment.

FIGS. 1 and 2 show an arrangement 1 with a first component 3 and a second component 4. The two components 3, 4 overlap. In the overlap region, the two components 3, 4 are joined together by means of an adhesive layer 2.

Merely for the explanation of the invention, the components 3, 4 and the adhesive layer 2 in the Figures have been divided into finite elements.

FIG. 1 shows a schematic cross section view of the arrangement 1. FIG. 2 shows a schematic top view of the adhesive layer 2.

The adhesive layer 2 is divided into a central zone 5 and an edge zone 6. The edge zone 6 in the example shown fully surrounds the central zone 5. The adhesive used in the central zone 5 has a lesser elasticity than in the edge zone 6. As already described, different adhesives may be used in the central zone 5 and in the edge zone 6 for this effect. Alternatively or additionally, the adhesives in the central zone 5 and in the edge zone 6 may be hardened differently.

Figure 3:
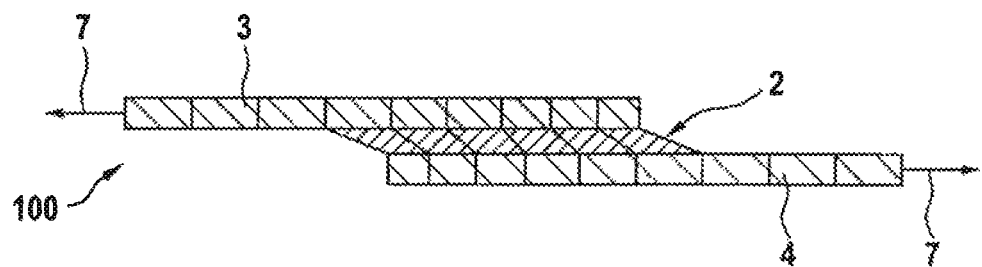
FIG. 3 is an arrangement according to the prior art.

As is shown by a consideration of the arrangement 100 of the prior art in FIG. 3, under tensile loading the greatest stresses occur in the edge zone 6. Since according to the invention a relatively elastic bonding has been chosen in the edge zone 6, these peak stresses can be absorbed without failure of the components.

LIST OF REFERENCE NUMBERS 1 glued arrangement
2 adhesive layer
3 first component
4 second component
5 central zone
6 edge zone
7 force
100 glued arrangement according to the prior art The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A glued arrangement, comprising:
a first component, wherein the first component is a first body or chassis component of a motor vehicle;
a second component, wherein the second component is a second body or chassis component of the motor vehicle;
wherein a first portion of the first component which is less than a total length of the first component overlaps a second portion of the second component which is less than a total length of the second component as an overlap region; and
a single adhesive layer, wherein the single adhesive layer is in contact with the first component and the second component in the overlap region and connects the first component to the second component in the overlap region;
wherein the single adhesive layer includes a central zone and an edge zone that encloses the central zone and wherein, in a hardened state, a first adhesive in the edge zone has a greater elasticity than a second adhesive in the central zone;
and wherein for a quotient (Q=F/G) of an area (F) of the edge zone and a total area (G) of the single adhesive layer, a lower limit of the quotient is at least 0.01 and an upper limit of the quotient is at most 0.8.

2. The glued arrangement as claimed in claim 1, wherein the first adhesive and the second adhesive are different adhesives or wherein the first adhesive and the second adhesive are a same adhesive.

3. The glued arrangement as claimed in claim 1, wherein the central zone is more hardened than the edge zone.

4. The glued arrangement as claimed in claim 2, wherein the central zone is more hardened than the edge zone.

5. The glued arrangement as claimed in claim 1, wherein the edge zone is disposed at least 30% around a periphery of the central zone.

6. The glued arrangement as claimed in claim 1, wherein the edge zone is directly adjacent to the central zone.

7. The glued arrangement as claimed in claim 1, wherein an E modulus of the central zone is at least 120% of an E modulus of the edge zone.

8. The glued arrangement as claimed in claim 2, wherein an E modulus of the central zone is at least 120% of an E modulus of the edge zone.

9. The glued arrangement as claimed in claim 3, wherein an E modulus of the central zone is at least 120% of an E modulus of the edge zone.

10. The glued arrangement as claimed in claim 1, wherein a tensile shear strength of the central zone is at least 120% of a tensile shear strength of the edge zone.

11. The glued arrangement as claimed in claim 2, wherein a tensile shear strength of the central zone is at least 120% of a tensile shear strength of the edge zone.

12. The glued arrangement as claimed in claim 3, wherein a tensile shear strength of the central zone is at least 120% of a tensile shear strength of the edge zone.

13. The glued arrangement as claimed in claim 7, wherein a tensile shear strength of the central zone is at least 120% of a tensile shear strength of the edge zone.

14. A method for making a glued arrangement, comprising the act of:

connecting a first component to a second component via a single adhesive layer, wherein the first component is a first body or chassis component of a motor vehicle, wherein the second component is a second body or chassis component of the motor vehicle, wherein a first portion of the first component which is less than a total length of the first component overlaps a second portion of the second component which is less than a total length of the second component as an overlap region, and wherein the single adhesive layer is in contact with the first component and the second component in the overlap region and connects the first component to the second component in the overlap region;

wherein the single adhesive layer includes a central zone and an edge zone that encloses the central zone, wherein, in a hardened state, a first adhesive in the edge zone has a greater elasticity than a second adhesive in the central zone, wherein the first adhesive and the second adhesive are different adhesives and/or wherein the first adhesive and the second adhesive have different hardenings, and wherein for a quotient (Q=F/G) of an area (F) of the edge zone and a total area (G) of the single adhesive layer, a lower limit of the quotient is at least 0.01 and an upper limit of the quotient is at most 0.8.

15. The method as claimed in claim 14, wherein for the different hardenings, a different quantity of a hardener is used and/or the edge zone and the central zone are heated differently and/or the edge zone and the central zone are treated differently with ultraviolet light.

\* \* \* \* \*